US012712238B2

(12) United States Patent
Lee

(10) Patent No.: US 12,712,238 B2
(45) Date of Patent: Aug. 18, 2026

(54) THERMAL RUNAWAY TRANSFER DEFENSE SYSTEM

(71) Applicant: HYUNDAI MOBIS CO., LTD., Seoul (KR)

(72) Inventor: Yoo Jeong Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 615 days.

(21) Appl. No.: 18/203,269

(22) Filed: May 30, 2023

(65) Prior Publication Data

US 2024/0396155 A1 Nov. 28, 2024

(30) Foreign Application Priority Data

May 24, 2023 (KR) ........................ 10-2023-0066745

(51) Int. Cl.
*H01M 50/342* (2021.01)

(52) U.S. Cl.
CPC ............................... *H01M 50/3425* (2021.01)

(58) Field of Classification Search
CPC ........... H01M 50/209; H01M 50/3425; H01M 50/367; Y02E 60/10
See application file for complete search history.

(56) References Cited

U.S. PATENT DOCUMENTS

2021/0328281 A1* 10/2021 Chu .................... H01M 50/204
2022/0402622 A1* 12/2022 Villanueva ........... B64D 27/357

FOREIGN PATENT DOCUMENTS

| | | | |
|---|---|---|---|
| EP | 3 890 057 | A1 | 10/2021 |
| KR | 10-2023-0013978 | A | 1/2023 |
| WO | 2022/260425 | A1 | 12/2022 |
| WO | 2022/270746 | A1 | 12/2022 |

OTHER PUBLICATIONS

Extended European search report issued on Nov. 29, 2024 in European Patent Application No. 23208607.4.

* cited by examiner

*Primary Examiner* — Victoria H Lynch
(74) *Attorney, Agent, or Firm* — Morgan, Lewis & Bockius LLP

(57) ABSTRACT

The present invention relates to a system for dealing with thermal runaway of a battery module. The thermal runaway transfer prevention system according to the present invention includes a duct connected to each battery module to allow gas or the like to move, thereby discharging gas through an intended path. Two or more types of venting devices are provided in parallel at one end of the duct, and a porous venting device is additionally provided between the duct and the battery module to compensate for the disadvantages of the respective venting devices, thereby maintaining internal conditions of a battery when thermal runaway does not occur (normal operation) and at the same time, quickly dealing with thermal runaway when the thermal runaway occurs.

8 Claims, 8 Drawing Sheets

PRIOR ART

THERMAL RUNAWAY TRANSFER DEFENSE SYSTEM

CROSS-REFERENCE TO RELATED APPLICATIONS

This application claims priority under 35 U.S.C. § 119 to Korean Patent Application No. 10-2023-0066745, filed on May 24, 2023, in the Korean Intellectual Property Office, the disclosure of which is incorporated herein by reference in its entirety.

TECHNICAL FIELD

The following disclosure relates to a system for dealing with thermal runaway of a battery module.

BACKGROUND

A secondary battery easily applied to various product groups and having electrical characteristics such as a high energy density has been generally applied to an electric vehicle or a hybrid vehicle driven by an electrical driving source, a power storage device, and the like, as well as a portable device. Such a secondary battery has attracted attention as a new energy source for eco-friendliness and energy efficiency improvement due to an advantage that a by-product caused by the use of energy is not generated at all as well as a primary advantage that the use of fossil fuels may be significantly decreased.

However, one or two or more battery cells are used for one small mobile device, whereas a large device such as an electric vehicle or aircraft requires a high power, large-capacity battery. Therefore, a medium-sized or large-sized battery module in which a plurality of battery cells are electrically connected is used. Since it is preferable that the large-sized battery module has a size and weight as small as possible, the battery cells may be stacked at a high degree of integration. In addition, a prismatic battery, a pouch type battery, or the like, having a small weight for its capacity has been mainly used as a battery cell of the large-sized battery module. Meanwhile, the battery module may include a frame member whose front surface and rear surface are opened to accommodate the battery cell stack therein in order to protect the cell stack from an external impact, heat or vibration.

At this time, a number of parts including the frame member are applied at an upper portion of the battery cell stack in order to support the battery cell stack, which makes it difficult to apply a structure for cooling the entire battery cell stack. Accordingly, only a lower portion of the battery cell is cooled in the related art, and thus, efficiency in controlling the temperature of the battery cell is very low.

In addition, a phenomenon has occurred in which since a number of battery cells are stacked, when the temperature of one battery cell rises above a certain level, nearby battery cells are affected, leading to thermal runaway, and an internal pressure increases during the thermal runaway due to the frame member protecting the battery cell stack, and the battery cell stack explodes due to the increase in internal pressure, and the related art has a problem in that stability against such a phenomenon is very low.

Therefore, a method for minimizing an impact on nearby battery modules when thermal runaway occurs in a specific battery module has been required. According to the related art, a rupture disc that is ruptured to discharge gas generated inside to the outside when a pressure inside a battery case or battery module increases, or a pressure relief device that discharges gas generated inside to the outside by movement of a membrane when the pressure inside the battery case or battery module increases is applied to the battery.

However, the related art has a problem in that when thermal runaway occurs, high-temperature inflammable gas spreads to the entire battery case or to all cells inside the battery module, which may lead to transfer of the thermal runaway to adjacent cells and modules. As for the above-described components, it is impossible to discharge gas below a certain pressure when the rupture disc is used alone, and thus, it is difficult to cope with generation of minute heat or gas. In addition, it is impossible to discharge a large amount of gas after thermal runaway due to a low discharge gas flow rate when the pressure relief device is used alone, and thus, only limited measures may be taken when thermal runaway occurs.

RELATED ART DOCUMENT

Patent Document (Patent Document 1) Korean Patent Laid-Open Publication No. 10-2023-0013978 "Battery Module with Improved Safety"

SUMMARY

An embodiment of the present invention is directed to providing a thermal runaway transfer prevention system that includes a duct connected to each battery module to allow gas or the like to move, thereby discharging gas through an intended path.

In the thermal runaway transfer prevention system, two or more types of venting devices are provided in parallel at one end of the duct, and a porous venting device is additionally provided between the duct and the battery module to compensate for the disadvantages of the respective venting devices, thereby maintaining internal conditions of a battery when thermal runaway does not occur (normal operation) and at the same time, quickly dealing with thermal runaway when the thermal runaway occurs.

In one general aspect, a thermal runaway transfer prevention system applied to at least one battery module to discharge heat and gas to the outside of a battery case during thermal runaway includes: a first vent portion having one surface in which a first communication hole communicating with the inside of the battery module is formed; a second vent unit having one surface in which a second communication hole communicating with the outside of the battery case is formed; and a vent channel portion connecting the first vent portion and the second vent portion to each other.

The vent channel portion may include a vent housing having a channel formed therein and having one end and the other end at which the first vent portion and the second vent portion are provided, respectively.

The vent housing may include two or more sub channels separated from each other, and one ends of the respective sub channels may communicate with each other by sharing one second vent portion.

The sub channels may extend in one direction of the battery case, communicate with two or more battery modules through the respective first vent portions, and communicate in a line with multiple battery modules positioned at the same point and having different phases in one direction.

The vent housing may further include a module connection channel having one end communicating with the sub channel and the other end communicating with the battery module, and the first vent portion may be disposed at the module connection channel.

The vent housing may include two or more sub channels separated from each other, and two or more second vent portions may be included and correspond one-to-one with and communicate with one ends of the respective sub channels.

The first vent portion may include a porous rupture disc that is ruptured when an internal and external pressure difference of the battery module is greater than a predetermined value to introduce or discharge air.

The second vent portion may include a rupture disc that is ruptured when a pressure difference between the inside of the vent channel portion and the outside of the battery case is greater than a predetermined value to introduce or discharge air.

A first pressure and a second pressure may be the same as each other, the first pressure being a minimum pressure difference at which the first vent portion is ruptured, and the second pressure being a minimum pressure difference at which the second vent portion is ruptured.

The second vent portion may further include a pressure relief device that is opened when a pressure difference between the inside of the vent channel portion and the outside of the battery case is greater than a predetermined value to introduce or discharge air, and the pressure relief device and the rupture disc may be disposed on the same surface.

DETAILED DESCRIPTION OF MAIN ELEMENTS

Figure 1:
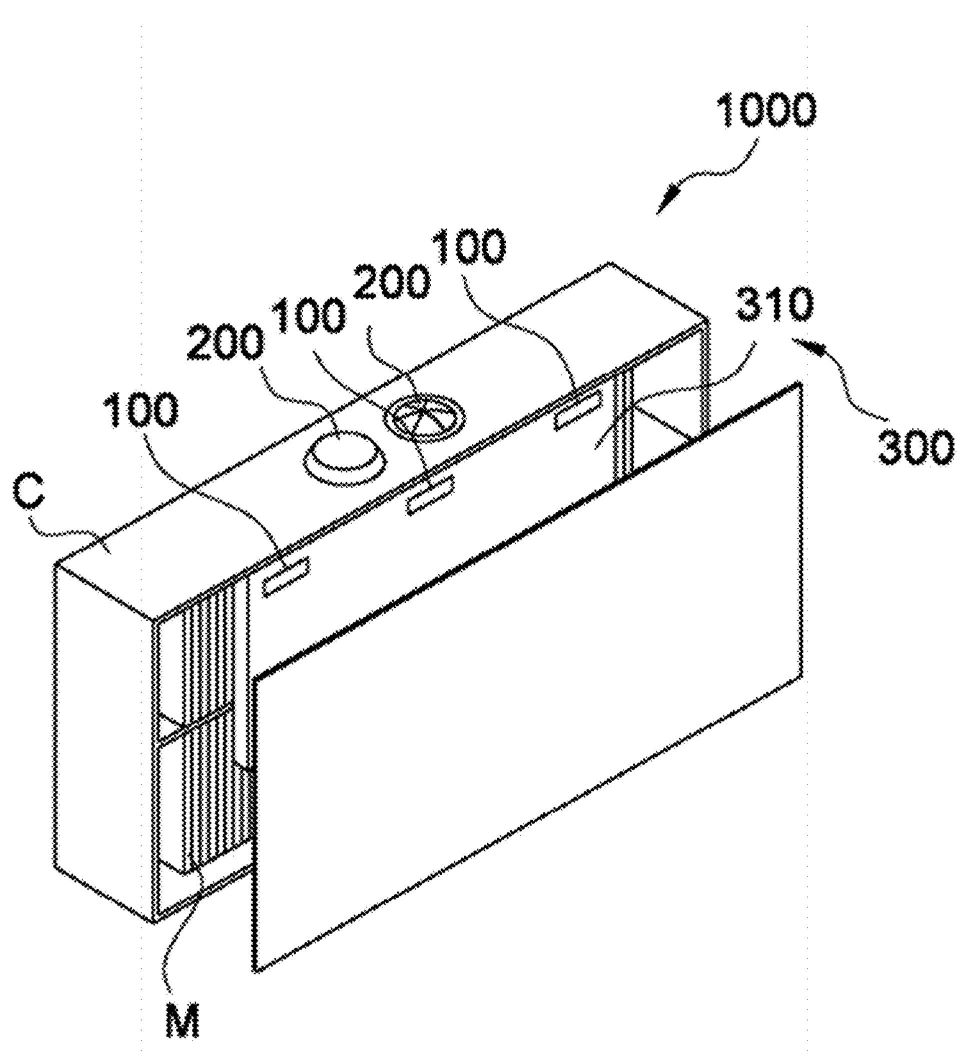
FIG. 1 is a perspective view of a thermal runaway transfer prevention system according to the present invention.

1000: thermal runaway transfer prevention system
100: first vent portion
110: first communication hole
120: porous rupture disc
200: second vent portion
210: second communication hole
220: rupture disc
230: pressure relief device
300: vent channel portion
310: vent housing
311: sub channel
312: module connection channel
M: battery module
C: battery case

DETAILED DESCRIPTION OF EMBODIMENTS

Hereinafter, the technical spirit of the present invention will be described in more detail with reference to the accompanying drawings. Terms and words used in the present specification and claims are not to be construed as a general or dictionary meaning, but are to be construed as meanings and concepts meeting the technical ideas of the present invention based on a principle that the present inventors may appropriately define the concepts of terms in order to describe their inventions in best mode.

Hereinafter, a basic configuration and principle of a thermal runaway transfer prevention system 1000 according to the present invention will be described with reference to FIGS. 1 and 2.

Figure 2:
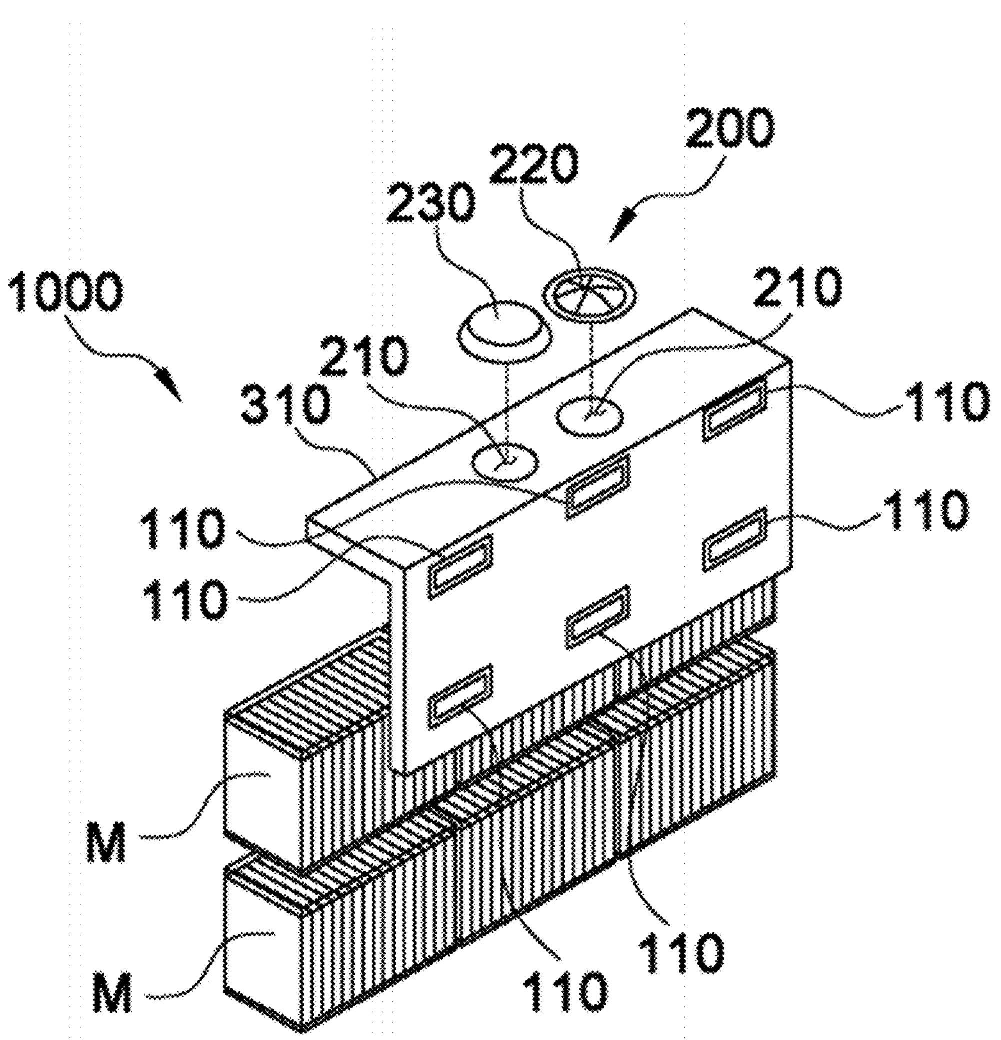
FIG. 2 is an exploded perspective view of the thermal runaway transfer prevention system according to the present invention.

The thermal runaway transfer prevention system 1000 according to the present invention illustrated in FIGS. 1 and 2 is applied to at least one battery module M to discharge heat and gas to the outside of a battery case C during thermal runaway. The thermal runaway transfer prevention system 1000 may include first and second vent portions 100 and 200 and a vent channel portion 300 connecting the first and second vent portions 100 and 200. In more detail, the first vent portion 100 may have one surface in which a first communication hole 110 communicating with the inside of a battery module M is formed, and may include a venting device applied to the first communication hole 110. Further, the second vent portion 200 may have one surface in which a second communication hole 210 communicating with the outside of the battery case C is formed, and may include a venting device applied to the second communication hole 210. The number of second communication holes 210 may be two or more, and the venting devices applied to the respective second communication holes 210 may have different structures.

In addition, the vent channel portion 300 may connect the first vent portion 100 and the second vent portion 200, and more specifically, may include a vent housing 310 having a channel formed therein. The first vent portion 100 and the second vent portion 200 may be provided at one end and the other end of the vent housing 310, respectively. That is, one end or the other end of the vent housing 310 may be in contact with a case of the battery module M, and the first communication hole 110 of the first vent portion 100 and the venting device may be formed and installed in a region that is in contact with the battery module M. In addition, a side of the vent housing 310 that is opposite to a side on which the first venting portion 100 is formed may come into contact with one surface (inner surface) of the battery case C, and the second communication hole 210 of the second vent portion 200 and the venting device may be formed and installed in a region that is in contact with the battery case C.

At this time, the first vent portion 100 or the second vent portion 200 may include two or more types of venting devices. In more detail, the first vent portion 100 may include a porous rupture disc 120 that is ruptured when an internal pressure of the battery module M is higher than a predetermined value to introduce or discharge air. The porous rupture disc 120 may include a rupturable film that is ruptured when an internal and external pressure difference is greater than a predetermined value, and a membrane that enables internal and external air exchange. That is, when the rupturable film is ruptured due to the pressure difference, the internal and external air change may be made through the membrane. Accordingly, even after the rupturable film is ruptured, the remaining gas inside the battery module M may be discharged by enabling a slight air exchange through the membrane until the thermal runaway is fully mitigated. Therefore, it may be possible to maintain stability for a long time. In addition, the membrane may also be designed to be ruptured when the internal and external pressure difference further increases.

In addition, the second vent portion 200 may include at least one rupture disc 220 that is ruptured when an internal pressure of the vent channel portion 300 is higher than a predetermined value to introduce or discharge air. The rupture disc 220 may include a rupturable film that is ruptured when an internal and external pressure difference is greater than a predetermined value. A pressure difference for rupture of the rupturable film and a rupture range of the rupturable film may be easily changed in design according to the use case. Since the second vent portion 200 includes the rupture disc 220, gas flowing inside the vent housing 310 may be discharged to the outside at a high speed. At this time, the rupturable film of the rupture disc 220 may be a fusible plug that melts at a certain temperature or higher, or may be a melting member.

At this time, a first pressure, which is a minimum pressure at which the rupturable film of the first vent portion 100 is ruptured, and a second pressure, which is a minimum pressure at which the rupturable film of the second vent portion 200 is ruptured, are preferably the same within a predetermined error range. Accordingly, when thermal runaway occurs, the battery module M and the inside of the vent housing 310, and the inside of the vent housing 310 and the outside of the battery case C may be simultaneously communicated.

In addition, the second vent portion 200 may further include a pressure relief device 230 that is opened when the internal pressure of the vent channel portion 300 is higher than a predetermined value to discharge air. The pressure relief device 230 may include an umbrella valve, which is a leaf spring that is deformed by an internal and external pressure difference. Accordingly, when the internal pressure increases, air flows from the inside to the outside, and when the external pressure increases, air flows from the outside to the inside, thereby making it possible to keep the internal and external pressure difference constant. In addition, the pressure relief device 230 may include a membrane such as a polytetrafluoroethylene (PTFE) membrane to enable internal and external air exchange without entry and exit of foreign substances.

The pressure relief device 230 may be additionally provided to serve as an auxiliary role for the above-described rupture disc 220. The pressure relief device 230 and the rupture disc 220 may be disposed on the same surface of the battery case C, that is, in a region where the battery case C and a battery housing are in contact with each other, and may be spaced apart from each other by a predetermined distance.

Hereinafter, a thermal runaway transfer prevention system 1000 according to a first embodiment of the present invention will be described in more detail with reference to FIGS. 3 to 7.

In the thermal runaway transfer prevention system 1000 according to the first embodiment of the present invention, the above-described vent housing 310 may include two or more sub channels 311 separated from each other. It is preferable that one ends of the respective sub channels 311 communicate with each other by sharing one second vent portion 200. That is, the sub channels may communicate with each other at a portion that is in contact with a battery case C, and may extend in different directions or to different positions to communicate with different battery modules M.

More specifically, the sub channels 311 may extend in one direction of the battery case C, communicate with two or more battery modules M through respective first vent portions 100, and communicate in a line with multiple battery modules M positioned at the same point and having different phases in one direction. Accordingly, the sub channel 311 connected to the battery module M in which thermal runaway has occurred and other sub channels 311 may be separated from each other, thereby preventing the transfer of the thermal runaway.

A blocking film or a venting device that is opened or closed by a pressure difference may be additionally provided upstream of a section in which the sub channels 311 communicate with each other or a section where each sub channel 311 communicates with a second vent portion 200. Accordingly, the sub channel 311 connected to the battery module M in which thermal runaway has occurred and other sub channels 311 may be more clearly separated from each other, thereby preventing the transfer of the thermal runaway.

Figure 3:
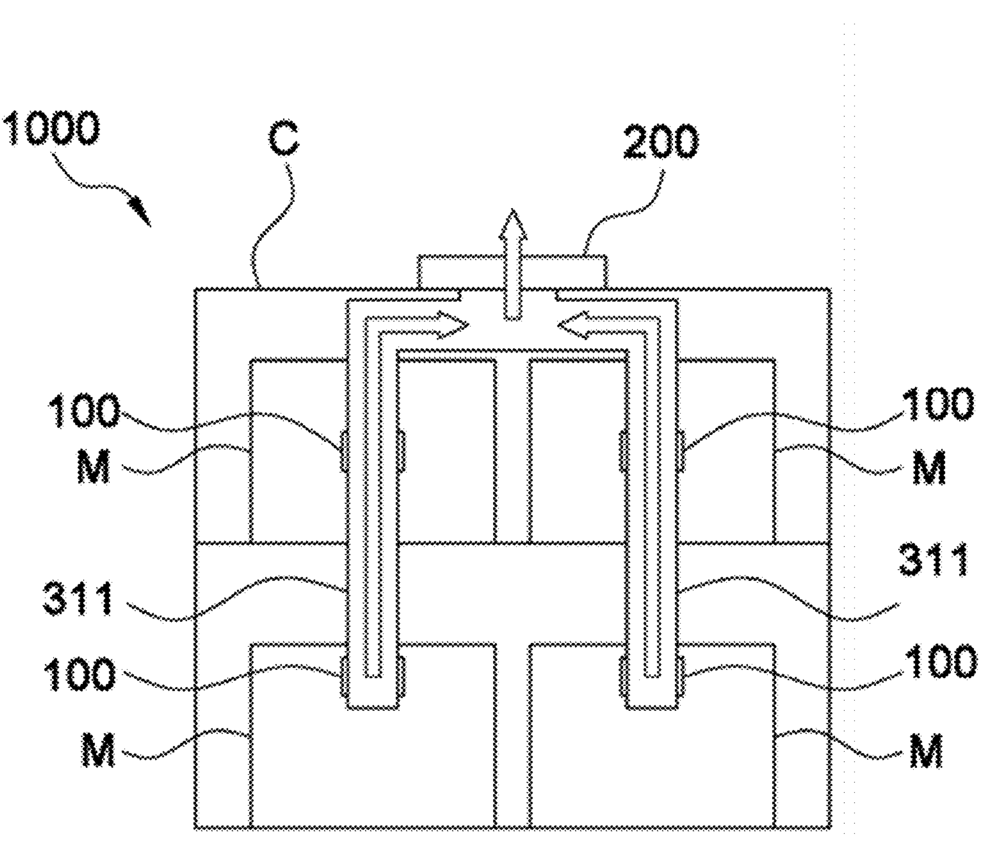
FIGS. 3 and 4 are cross-sectional views illustrating a thermal runaway transfer prevention system according to a first embodiment of the present invention.

In more detail, as illustrated in FIG. 3, the sub channels 311 may extend in a vertical direction and communicate with two or more battery modules M arranged in the vertical direction so that gas inside the battery module M in which thermal runaway has occurred may be discharged to the second vent portion 200, that is, to the outside.

Figure 4:
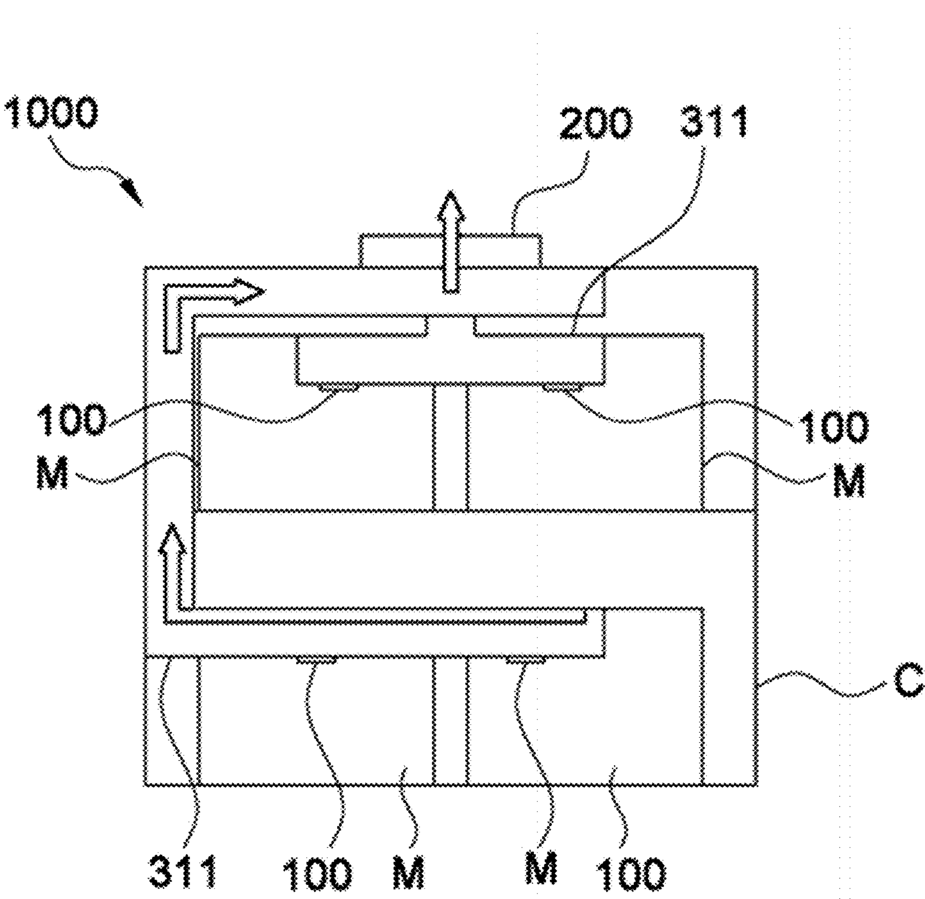

Further, as illustrated in FIG. 4, the sub channels 311 may extend in a horizontal direction and communicate with two or more battery modules M arranged in the horizontal direction so that gas inside the battery module M in which thermal runaway has occurred may be discharged to the second vent portion 200, that is, to the outside. In addition, according to the first embodiment of the present invention, the thermal runaway transfer prevention system 1000 according to the present invention may include both the sub channel 311 extending in the horizontal direction and the sub channel 311 extending in the vertical direction according to the arrangement of the battery modules M in the battery case C.

Figure 5:
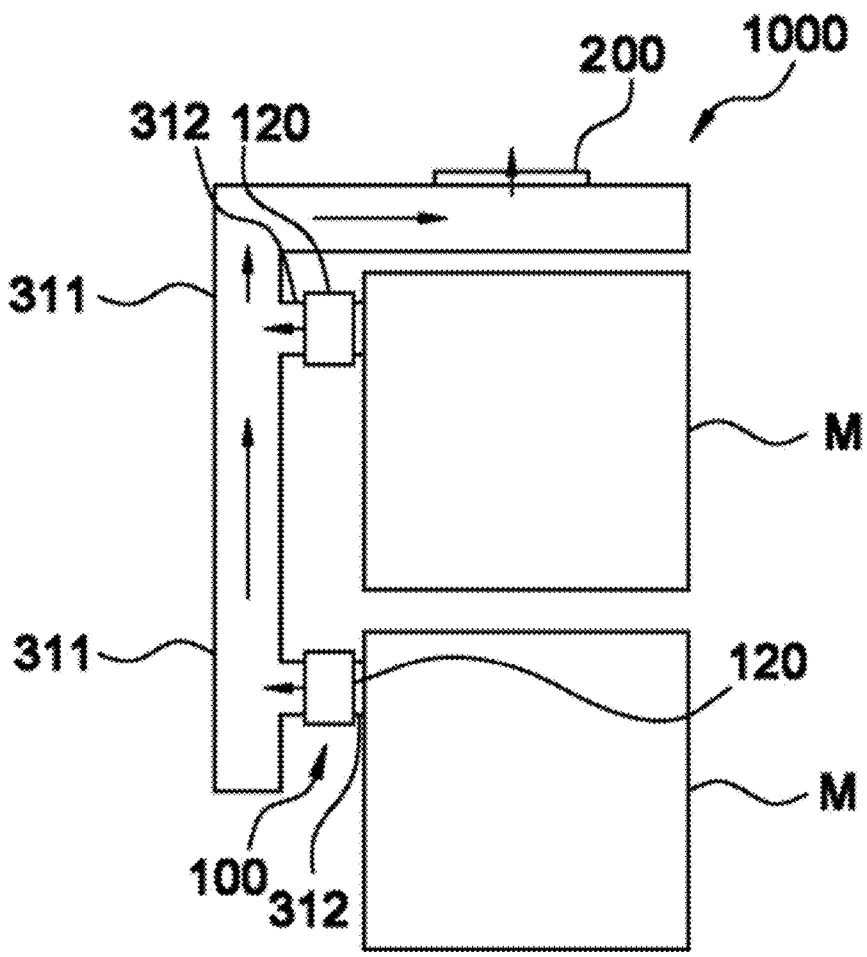
FIG. 5 is a cross-sectional view illustrating a first vent portion of the thermal runaway transfer prevention system according to the first embodiment of the present invention.

In the thermal runaway transfer prevention system 1000 according to the first embodiment of the present invention, as illustrated in FIG. 5, the vent housing 310 may further include a module connection channel 312 having one end communicating with the sub channel 311 and the other end communicating with the battery module M. The first vent portion 100 is preferably disposed at the module connection channel. In more detail, first communication holes 110 may be formed at both ends of the module connection channel, and the venting device (for example, a porous rupture disc 120) may be formed at the middle of the module connection channel.

As such, a venting device of the first vent portion 100 is provided between each battery module M and the sub channel 311, and thus, different battery modules M connected to the same sub channel 311 may be separated from each other. In addition, even in a case where thermal runaway occurs in one of the battery modules M, it is possible to prevent the thermal runaway from being transferred to a nearby battery module M along the sub channel 311.

Figure 6:
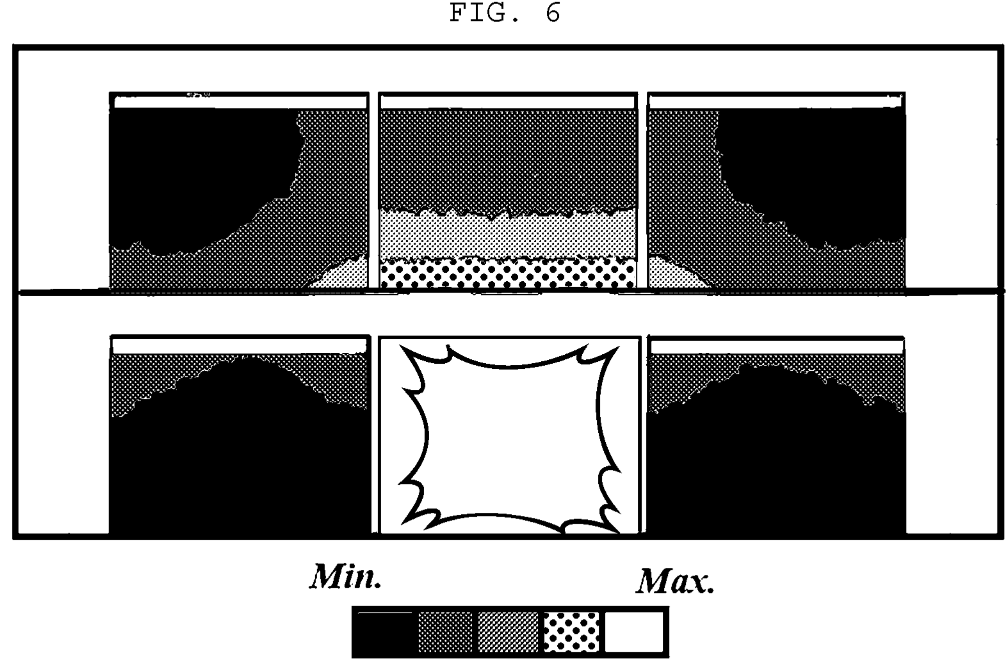
FIG. 6 is a graph illustrating thermal distribution when thermal runaway occurs in an existing battery structure.

An experiment was conducted to confirm whether or not thermal runaway is substantially prevented when the thermal runaway transfer prevention system 1000 according to the first embodiment of the present invention is applied. First, in a case of an existing battery system, as illustrated in FIG. 6, the maximum temperatures of battery modules M (positioned at lower corners) that are adjacent to the battery module M (positioned at the lower center side) where thermal runaway occurred were about 250 degrees. The maximum temperatures of the battery modules M (on the entire upper side) that are not adjacent to the battery module M (positioned at the lower center side) where thermal runaway occurred increased to 136 degrees exceeding 100 degrees which is a thermal runaway temperature of a pouch cell.

Figure 7:
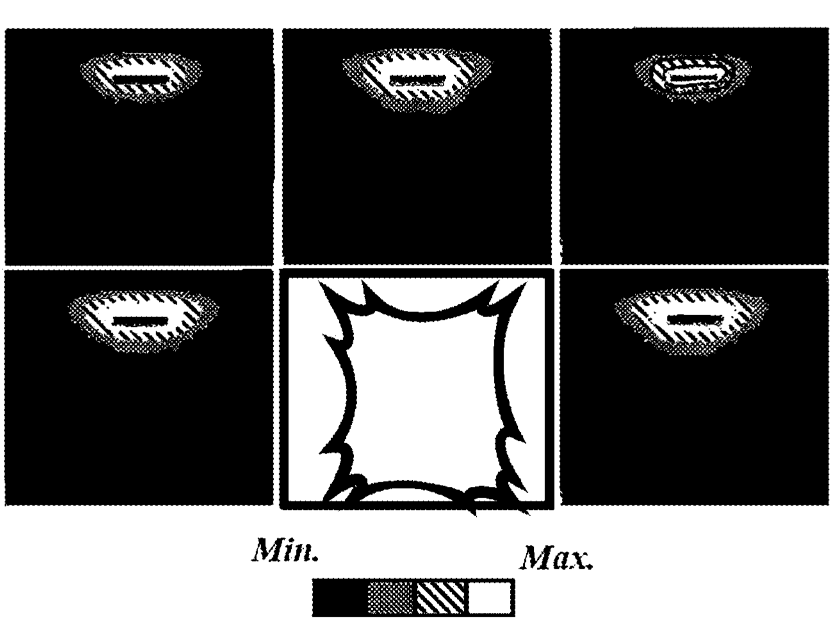
FIG. 7 is a graph illustrating thermal distribution when thermal runaway occurs in a structure to which the thermal runaway transfer prevention system according to the first embodiment of the present invention is applied.

On the other hand, as illustrated in FIG. 7, it was confirmed that, when the thermal runaway transfer prevention system 1000 according to the first embodiment of the present invention is applied, the temperatures of battery modules M (positioned at the lower corners and on the entire upper side) adjacent to the battery module M (positioned at the lower center side) where thermal runaway occurred did not increase in comparison to the related art, and the maximum temperature was only 56 degrees.

Hereinafter, a second embodiment of the present invention will be described in more detail with reference to FIG. 8.

Figure 8:
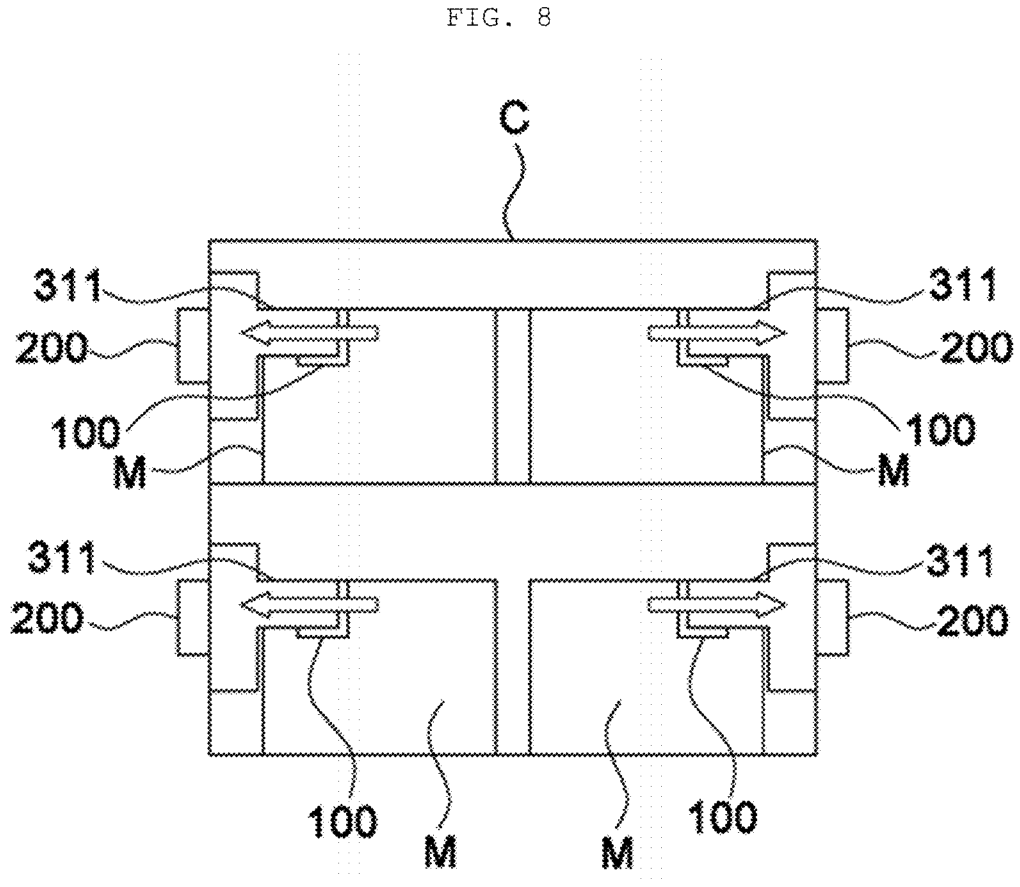
FIG. 8 is a cross-sectional view illustrating a thermal runaway transfer prevention system according to a second embodiment of the present invention.

As illustrated in FIG. 8, a vent housing 310 may include two or more sub channels 311 separated from each other. Here, each of the sub channels 311 may correspond one-to-one with battery modules M housed in a battery case C, and a first communication hole 110 of a first vent portion 100 may be formed between each battery module M and the sub channel 311. Two or more second vent portions 200 may be included and correspond one-to-one with and communicate with one ends of the respective sub channels 311. The second vent portion 200 may be installed on a wall surface of the battery case C close to each battery module M.

By applying the thermal runaway transfer prevention system 1000 according to the second embodiment of the present invention, each battery module M and the sub channel 311 are individually connected to each other, so that thermal transfer to a nearby battery module M may be significantly prevented. In addition, even in a case where the first vent portion 100 does not include a venting device, each battery module M and the sub channel 311 may be separated from each other, so that manufacturing convenience may be improved.

As described above, the thermal runaway transfer prevention system according to the present invention includes the duct connected to each battery module to allow gas or the like to move, thereby discharging gas through an intended path.

Further, two or more types of venting devices are provided in parallel at one end of the duct, and the porous venting device is additionally provided between the duct and the battery module to compensate for the disadvantages of the respective venting devices, thereby maintaining internal conditions of a battery when thermal runaway does not occur (normal operation) and, at the same time, quickly dealing with thermal runaway when the thermal runaway occurs.

The present invention should not be construed to being limited to the embodiment described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A thermal runaway transfer prevention system applied to at least one battery module, configured to discharge heat and gas to an outside of a battery case during thermal runaway, the thermal runaway transfer prevention system comprising:
- a first vent portion having one surface in which a first communication hole configured to communicate with an inside of the battery module is formed;
- a second vent portion having one surface in which a second communication hole configured to communicate with the outside of the battery case is formed; and
- a vent channel portion configured to connect the first vent portion and the second vent portion to each other,
- wherein the vent channel portion includes a vent housing having a channel formed therein, the vent housing including a module connection channel having one end in communication with a sub channel and another end in communication with the battery module, and
- wherein the first vent portion is disposed at the module connection channel.

2. The thermal runaway transfer prevention system of claim 1, wherein the vent housing includes two or more sub channels separated from each other, and
- wherein one end of each of the sub channels are configured to communicate with each other by sharing one second vent portion.

3. The thermal runaway transfer prevention system of claim 2, wherein the sub channels extend in one direction of the battery case,
- wherein the sub channels are configured to communicate with two or more battery modules through respective first vent portions, and
- wherein the sub channels are configured to communicate in a line with multiple battery modules positioned at a same point and having different phases in one direction.

4. The thermal runaway transfer prevention system of claim 1, wherein the vent housing includes two or more sub channels separated from each other, and
- wherein two or more second vent portions are included and correspond one-to-one with and are configured to communicate with one end of the respective sub channels.

5. The thermal runaway transfer prevention system of claim 1, wherein the first vent portion includes a porous rupture disc that is configured to rupture when an internal and external pressure difference of the battery module is greater than a predetermined value to introduce or discharge air.

6. The thermal runaway transfer prevention system of claim 1, wherein the second vent portion includes a rupture disc that is configured to rupture when a pressure difference between an inside of the vent channel portion and the outside of the battery case is greater than a predetermined value to introduce or discharge air.

7. The thermal runaway transfer prevention system of claim 1, wherein a first pressure and a second pressure are equal to each other, the first pressure being a minimum pressure difference at which the first vent portion is ruptured, and the second pressure being a minimum pressure difference at which the second vent portion is ruptured.

8. The thermal runaway transfer prevention system of claim 6, wherein the second vent portion further includes a pressure relief device that is configured to open when a pressure difference between the inside of the vent channel portion and the outside of the battery case is greater than a predetermined value to introduce or discharge air, and wherein the pressure relief device and the rupture disc are disposed on the same surface.

* * * * *